United States Patent [19]

Lee

[11] Patent Number: 5,295,129
[45] Date of Patent: Mar. 15, 1994

[54] LIGHT SIGNAL DETECTING CIRCUIT
[75] Inventor: Chul-woo Lee, Seoul, Rep. of Korea
[73] Assignee: Samsung Electronics Co., Ltd., Kyunggi, Rep. of Korea
[21] Appl. No.: 753,640
[22] Filed: Aug. 30, 1991
[30] Foreign Application Priority Data Aug. 31, 1990 [KR] Rep. of Korea ............... 90-13716

[51] Int. Cl.$^5$ .............................................. G11B 7/13
[52] U.S. Cl. .................................... 369/122; 369/110; 369/124
[58] Field of Search ............... 369/44.32, 110, 124, 369/116, 122; 250/201.5, 205

[56] References Cited

U.S. PATENT DOCUMENTS 4,460,977  7/1984  Shimada et al. .................... 250/570

Primary Examiner—Donald E. McElheny, Jr.
Attorney, Agent, or Firm—Rothwell, Figg, Ernst & Kurz

[57] ABSTRACT

A light signal detecting circuit which receives via a light detector light radiated from a laser diode oscillated as a multimode by a high frequency driving signal and reflected from an optical disk, amplifies a current signal proportional to the amount of the received light to a light detecting signal and outputs the signal, further includes a phase sensitive detector for selectively outputting from the current signal only a signal component having the same frequency and phase as the high frequency driving signal for driving said laser diode. Accordingly, a signal component with different frequency and phase from the output of laser diode is intercepted, and only a signal component with the same frequency and phase as the output of laser diode is detected.

6 Claims, 4 Drawing Sheets

LIGHT SIGNAL DETECTING CIRCUIT

BACKGROUND OF THE INVENTION

The present invention relates to an optical disk player, and more particularly to a light signal detecting circuit for a magnetooptical disk player.

In general, a magnetooptical disk player reproduces recorded information by irradiating laser beam focused in a minute spot with the diameter of about 1 μm onto the magnetooptical disk, then detecting the information recorded in the magnetization direction of magnetooptical material by converting the information to the rotation of polarized surface according to Kerr or Faraday effect that explains the interaction between light and magnetization.

Referring to FIG. 1, such magnetooptical disk player irradiates laser beam from a semiconductor laser diode 2 onto a magnetooptical disk 6, and detects light reflected from the magnetooptical disk by converting the rotation variation of the polarized surface to light intensity variation by an analyzer such as polarizing beam splitter (PBS). In other words, a differential light detector detects the difference of light intensity between polarized component passing through the PBS and polarized component reflected from the PBS to output reproduced data signal. Accordingly, since the conventional magnetooptical disk player detects a signal by S/N ratio, the improvement of the S/N ratio means the improvement of reproduction efficiency. As shown in FIG. 2, the magnetooptical disk player has light intensity noise of semiconductor, short noise of light detector caused by PN junction, and thermal noise of signal amplifier, which are problems to solve.

The light intensity noise of semiconductor laser has a close relation with an oscillate mode of laser. Thus, recently, a single mode semiconductor laser diode is driven by a high frequency signal of hundreds of MHz so as to operate the diode as a multimode diode which reduces the semiconductor laser noise. However, since the short noise of light detector is relatively greater than the thermal noise of signal amplifier, a finally output S/N value is greatly affected by the short noise.

SUMMARY OF THE INVENTION

Therefore, it is an object of the present invention to provide a light signal detecting circuit which can eliminate the short noise of light detector.

It is another object of the present invention to provide a light signal detecting circuit which can improves signal/noise ratio.

To attain the objects of the present invention, there is provided a light signal detecting circuit which receives via a light detector light which is radiated from a laser diode oscillated as a multimode by a high frequency driving signal and is reflected from an optical disk, amplifies a current signal proportional to the amount of the received light to a light detecting signal and outputs it, and which further comprises a phase sensitive detector for selectively outputting from the current signal only a signal component having the same frequency and phase as those of the high frequency driving signal for driving the laser diode.

BRIEF DESCRIPTION OF THE DRAWINGS

The above objects and other advantages of the present invention will become more apparent by describing in detail a preferred embodiment of the present invention with reference to the attached drawings in which.

DETAILED DESCRIPTION OF THE INVENTION

Figure 1:
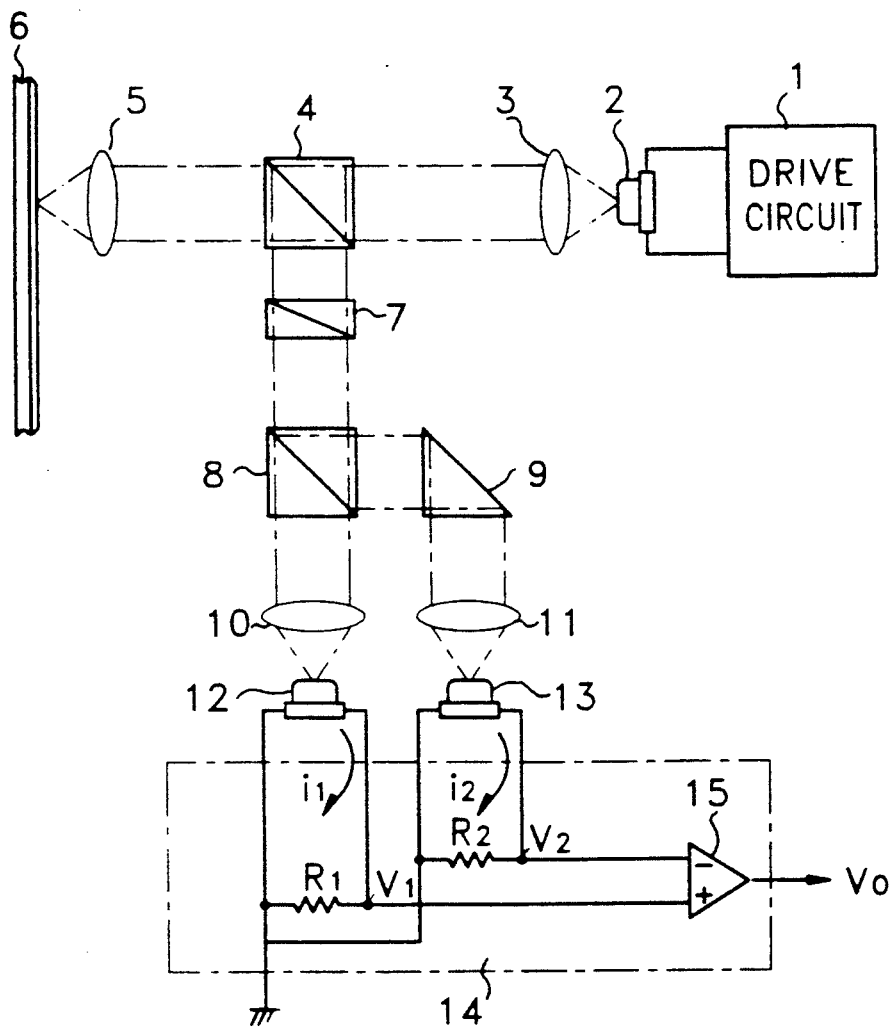
FIG. 1 is a schematic diagram of a light signal detecting system of an ordinary magnetooptical disk player.

To further the understanding of the present invention, a conventional magnetooptical disk player will be described in detail with reference to FIG. 1. Referring to FIG. 1, driver 1 drives semiconductor laser diode 2 by a high frequency signal of hundreds of MHz so as to radiate optically modulated laser beam. The radiated laser beam is focused on a track of magnetooptical disk 6 in the form of minute spot with the diameter of 1 μm by passing through lens 3, beam splitter (BS) 4, objective lens 5. The light incident upon magnetooptical disk 6 is reflected from the surface of the disk and along the incident path. Part of the reflected light is reflected from the slant of BS 4, and the remainder is transmitted to be incident upon semiconductor laser diode 2. The light reflected from BS 4 passes through $$\frac{\lambda}{2}$$

plate 7 to be rotated by 45°, which is then, incident upon PBS 8. Part of the light incident upon PBS 8, that is, P polarized component in parallel with the incident surface, is transmitted to be focused by lens 10 on the first light detector 12 that is a PIN diode, and the remainder, that is, S polarized component perpendicular to the incident surface is reflected from the slant of PBS, and is reflected from the slant of prism 9 again to be focused on the second light detector 13 by lens 11. In detector 14, current signals $i_1$ and $i_2$ which are detected by a pair of light detectors 12 and 13 are applied to resistors R1 and R2 to be converted to voltage signals $V_1 = i_1 R_1$ and $V_2 = i_2 R_2$, which are supplied to each input port of differential amplifier 15, and then, the differential amplifier 15 outputs a reproduced data signal. The output $V_0$ is expressed as follows.

$$V_0 = V_1 - V_2 = i_1 R_1 - i_2 R_2 = R(i_1 - i_2)$$

where $R = R_1 = R_2$.

The conventional light signal detecting circuit is disadvantageous in decreasing the efficiency of a reproduced signal because of its small S/N value, since the conventional light signal detecting circuit cannot eliminate, from the detected reproduced signal, its phase difference produced from the optical system and short noise produced from the light detector. The conventional light signal detecting circuit has the limit in achieving the precision of the optical system for eliminating the phase difference produced from the optical system and the performance improvement of light detector for eliminating short noise.

Therefore, the present invention is designed to improve the S/N value of the optically detected signal by eliminating the short noise and phase difference.

Figure 3:
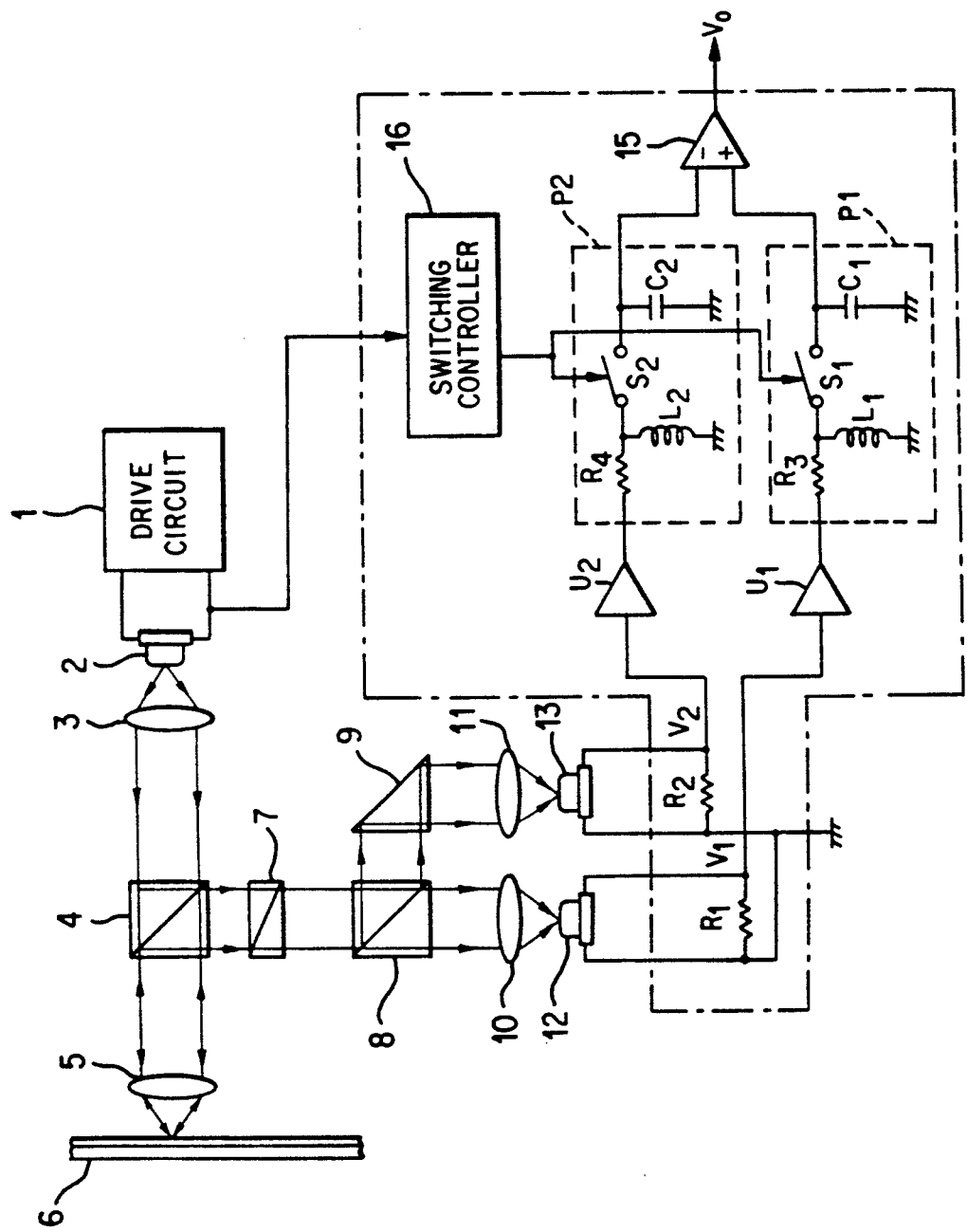
FIG. 3 illustrates one embodiment of a light signal detecting system according to the present invention.

Referring to FIG. 3, in the front or end of differential amplifier 15, the light signal detecting circuit of the present invention is provided with a phase sensitive detector or, a lock in amplifier for detecting only a signal component having the same frequency and phase as those of a semiconductor laser diode. The like parts in FIG. 3 corresponding to those in FIG. 1 are represented by the same reference numerals and a detailed description about it is abbreviated.

In one embodiment of FIG. 3, the present invention comprises a tuned circuit consisting of an operational amplifier (U₁ and U₂, respectively) and a LC parallel circuit between each input port of light detectors 12 and 13 and differential amplifier 15, first and second phase sensitive detectors P1 and P2 which interpose between an inductor (L₁ and L₂, respectively) and capacitor (C₁ and C₂, respectively) a switch (S₁ and S₂, respectively) which is switched by being phase synchronized by a driving signal of the semiconductor laser diode via switching controller 16. Suppose that the frequency of high frequency driving signal of semiconductor laser diode 2 is $f_0$, output amplitude is I, and period $$\tau_0 = \frac{1}{2\pi f_0},$$

light output $I_1(t)$ is represented as $$I_1(t) = I_1 \cdot \sin\left(\frac{1}{\tau_0} t\right) + I_c \quad (1)$$

where $I_c$ is a constant output by time. When the light output is received by a light detector which has rising and falling time $\tau$, the current signal $I_2(t)$ of the light detector is $$I_2(t) = (a^2 + b^2)^{\frac{1}{2}}\sin\left(\frac{t}{\tau_0} + \delta_1 + \delta_2\right) + I_n \quad (2)$$

where $$a = \{2I_2\tau_0/(\tau^2 + 4\pi^2\tau_0^2)\}\left(\exp[-1] + 2\exp\left[-\frac{1}{2}\right] + 1\right),$$

$$b = \left(\frac{2I_2}{\pi} - \frac{4\pi I_2}{1 + 4\pi^2\tau^2}\right)\left(\exp\left[\frac{\tau_0}{\tau}\right] + 2\exp\left[\frac{\tau_0}{\tau}\right] + 1\right),$$

$I_2$ is amplitude, $$\delta_1 = \tan^{-1}\left(\frac{b}{a}\right), \delta_2$$

is trigger phase, and $I_n$ is noise current. Therefore, output current $I_3(t)$ is given as $$I_3(t) = (1 + I_s) \cdot I_3(t) + I_a$$

where $I_3$ is output current of amplifier, $I_s$ is short noise current, and $I_a$ is noise current of amplifier.

The short noise current $I_s$ is a current which is produced when electron hole pairs are generated at random by the light at the depletion region of PN junction in the light detector, and forms Gaussian distribution. When the short noise current Is is expanded by Fourier series, $$I_s = \Sigma(a_n \sin \omega nt + b_n \cos \omega nt) I_m(t)(-T \leq t \leq T) \quad (3)$$

where coefficient $a_n^2 = b_n^2$, $a_n = b_n = 0$.

According to the above equations (2) and (3), $$I_3(t) = (a^2 + b^2)^{\frac{1}{2}}\sin\left(\frac{t}{\tau_0} + \delta_1 + \delta_2 - \frac{\pi}{2}\right).$$

$$(1 + a_n\sin\omega nt + b_n\cos\omega nt) \quad (4)$$

Thus, as the current expressed by equation (4) passes through the LC parallel synchronous circuit having synchronous frequency $W_0 = 2\pi f_0$, the current Ic of capacitor C becomes $$I_c = (a^2 + b^2)^{\frac{1}{2}}\sin\left(\frac{t}{\tau_0} + \delta_1 + \delta_2 - \frac{\pi}{2}\right) \quad (5)$$

The above equation shows the removal of noise. Further, when $\tau < \tau_0$, by controlling the phase of switch to make $$\delta_1 + \delta_2 - \frac{\pi}{2} = 0,$$

a signal component with phase difference is intercepted. Accordingly, a signal component with different frequency and phase from those of the output of laser diode is intercepted, and only a signal component with the same frequency and phase as those of the output of laser diode is detected.

Figure 2:
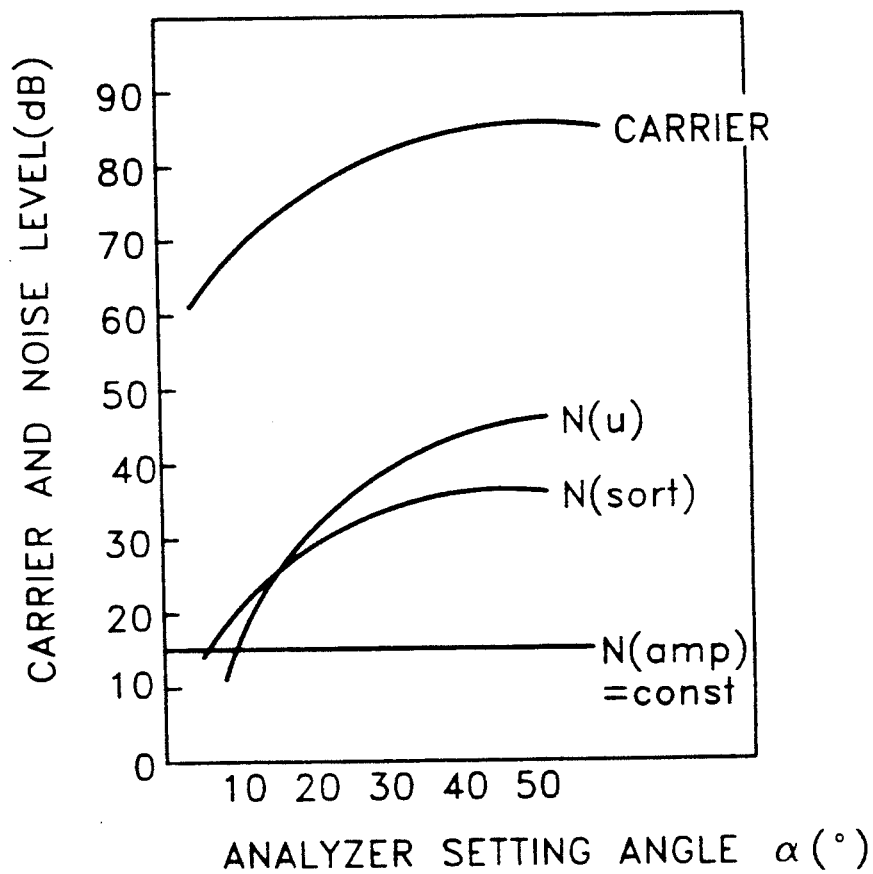
FIG. 2 is a graph showing the relation between angle of a PBS of FIG. 1 and signal and noise current.

Therefore, the present invention has improved carrier/noise ratio up to C/N = 10log₁₀[Ic² + Ia²] from C/N = 10log₁₀[Ic²/(Is² + Ia²)]. Referring to FIG. 2, eliminating not only laser noise but short noise, the present invention improves C/N value up to about 20 dB at the angle of analyzer $\alpha = 45°$.

Figure 4:
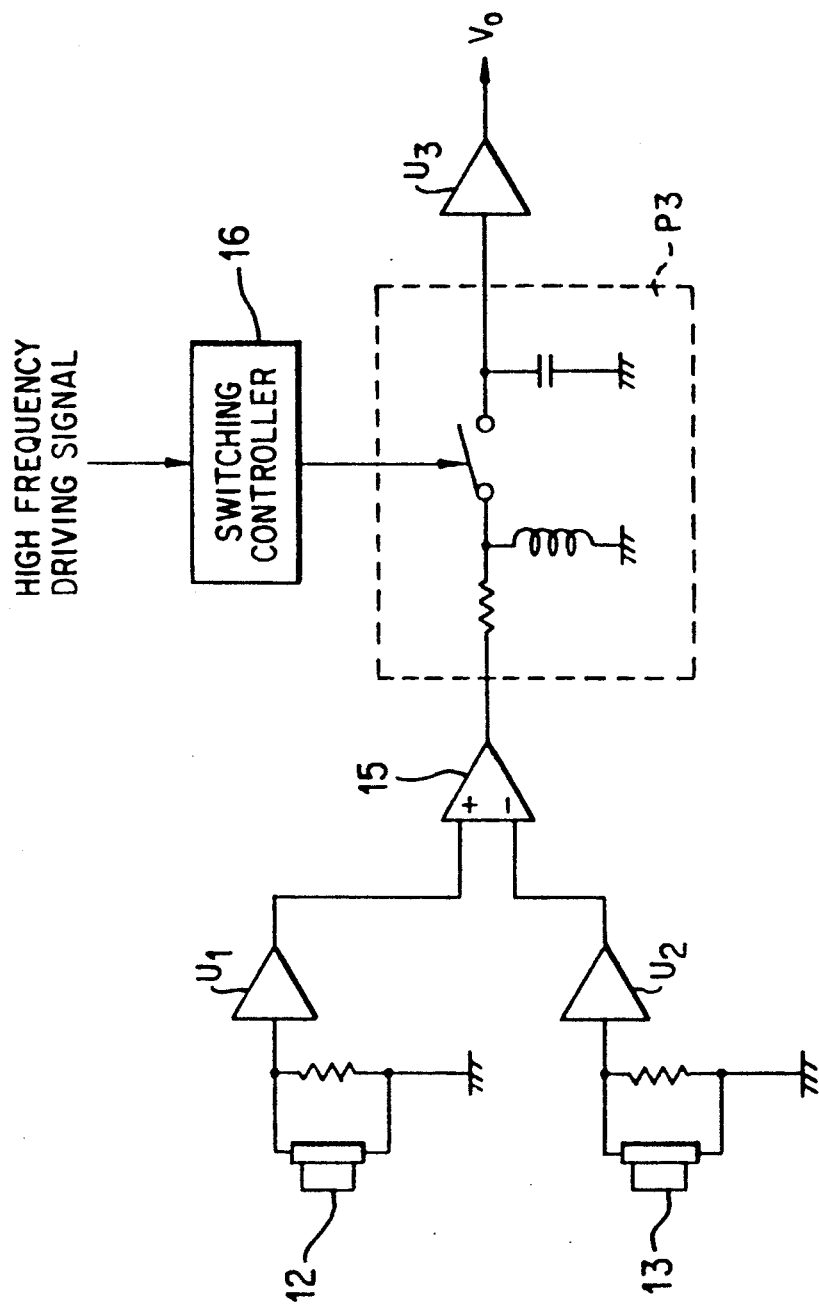
FIG. 4 illustrates another embodiment of the light signal detecting circuit shown in FIG. 3.

FIG. 4 illustrates another embodiment of the light detector of FIG. 3, wherein phase sensitive detector P3 an operational amplifier V₃ are connected to the next stage of differential amplifier 15, and shows more simplified circuitry than FIG. 3. The elements in FIG. 4 corresponding to the same elements in FIG. 3 have the same reference numerals and have been previously described.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. A light signal detecting circuit for use in an optical disk player having a laser diode oscillated in a multimode by a high-frequency driving signal, the laser diode radiating light which is reflected from the surface of an optical disk, said detecting circuit comprising:

a pair of light detector means, each for respectively converting light reflected from the optical disk into a detecting signal proportional to the amount of light received;

a pair of phase-sensitive detector means each for filtering a respective one of said detecting signals of said light detector means according to the high-frequency driving signal and each outputting a filtered signal having the same frequency and phase as the high-frequency driving signal; and a differential amplifier means for outputting a differential signal representing the difference between said filtered signals of said phase-sensitive detector means.

2. The light signal detecting circuit as set forth in claim 1, wherein said pair of phase-sensitive detector means each comprises:

an inductor connected between a ground and an input node supplying said detecting signal of one of said light detectors;

a capacitor connected between said ground and an output node for outputting said filtered signal; and a switch connected between said input node and said output node and switched according to said high-frequency driving signal.

3. The light signal detecting circuit as claimed in claim 1, further including a pair of amplifiers coupled between said light detector means and said phase-sensitive detector means for amplifying said detecting signals.

4. A light signal detecting circuit for use in an optical disk player having a laser diode oscillated in a multi-mode frequency by a high-frequency driving signal, the laser diode radiating light which is reflected from the surface of an optical disk, said detecting circuit comprising:

a pair of light detector means, each for respectively converting light reflected from the optical disk into a detecting signal proportional to the amount of light received;

a differential amplifier means, coupled to receive said detecting signals of said pair of light detector means, for outputting a differential signal representing the difference between said detecting signals; and a phase-sensitive detector means for filtering said differential signal according to said high-frequency driving signal and outputting a filtered signal having the same frequency and phase as said high-frequency driving signal.

5. The light signal detecting circuit as set forth in claim 4, wherein said phase-sensitive detector comprises:

an inductor connected between a ground and an input node coupled to received said differential signal;

a capacitor connected between said ground and an output node for outputting said filtered signal; and a switch connected between said input node and said output node and switched according to said high-frequency driving signal.

6. The light signal detecting circuit of claim 4, further including a pair of amplifiers connected between said pair of light detectors and said differential amplifier for amplifying said detecting signals of said pair of light detectors.

* * * * *

UNITED STATES PATENT AND TRADEMARK OFFICE
CERTIFICATE OF CORRECTION

PATENT NO. : 5,295,129
DATED : March 15, 1994
INVENTOR(S) : Chul-woo Lee

It is certified that error appears in the above-identified patent and that said Letters Patent is hereby corrected as shown below:

Col. 4, line 26, "$\tau < \tau_o$" should be --$\tau \ll \tau_o$--.

Signed and Sealed this

Sixth Day of September, 1994

Attest:

BRUCE LEHMAN

Attesting Officer

Commissioner of Patents and Trademarks